United States Patent Office 2,925,448
Patented Feb. 16, 1960

2,925,448

METHOD OF STABILIZING A NUCLEAR REACTOR COOLANT

Eugene L. Colichman, Los Angeles, Calif., assignor to North American Aviation, Inc.

No Drawing. Application September 8, 1954
Serial No. 454,850

3 Claims. (Cl. 260—666.5)

The present invention concerns a method of stabilizing a nuclear reactor coolant. More particularly, the invention is directed to a method of making an organic coolant operational when such coolant is subjected to pyrolysis and nuclear irradiation. The invention is further directed to the formulation of a new and novel organic reactor coolant.

Various organic compounds have been suggested for use as a primary or secondary coolant in a nuclear reactor. Although the heat exchanging characteristics of these coolants are satisfactory, their use has been severely limited due to low pyrolitic and radiation stabilities. Heretofore, no practical solution has been suggested to prevent the simultaneous polymerization of dissociation products (resulting from pyrolitic and radiolitic decomposition) of the reactor coolant during operation, or to increase the over-all stability of the reactor coolant. The alpha, beta, gamma, fast neutron and other radiation energies emitted from the nuclear reactor, termed herein as "nuclear irradiations" have been found to have a definite tendency to cause formation of organo free radicals in the coolant presumably due to cleavage of the ring structure of the organic coolant. These free radical products tend to link with one another forming viscous polymers. The organic compounds which are usable as reactor coolants and are contemplated by this invention include the polyphenyls and the condensed ring compounds.

When the above organic materials are used as secondary coolants (i.e., not in a direct heat transfer relationship with the reactor core) they will be subjected to high temperatures (400°–1000° F.) and gamma radiation. If it were assumed that sodium was the primary coolant, the gamma radiation could be from $Na^{24}$ decay having an activity of $10^{13}$–$10^{15}$ disintegrations/sec. cc. When primary coolant usage is contemplated the organic coolant will be subjected to fast neutron fluxes ($1 \times 10^{12}$ to $2 \times 10^{13}$ neutrons/sec. cm.$^2$), thermal neutron fluxes ($5 \times 10^{12}$ to $1 \times 10^{14}$ neutrons/sec. cm.$^2$), and gamma activity ($1 \times 10^{11} \times 1 \times 10^{13}$ mev./sec. cc.) at temperatures of 400°–1000° F. For shield applications the organic coolant will be subjected to small fluxes of fast neutrons and gamma rays.

The amount and kind of nuclear irradiation will affect the degree of polymerization of the hydrocarbon coolants and will determine the operational characteristics of the coolant. The present invention provides a means to control the viscosity of the hydrocarbon coolant which is a measure of the degree of polymerization. This control thus functions to prevent fouling of the reactor cooling system.

The instant invention takes advantage of the phenomenon that the polyphenyls and condensed ring compounds when heated in the presence of the halides of aluminum and tin will degrade into lower benzene homologs. The invention comprehends balancing the tendency of the polyphenyls and condensed ring compounds to form phenyl free radicals, which link to each other forming higher homologs of benzene, with this degradation phenomenon. It is desired that these opposing effects, i.e., degradation to lower homologs and polymerization to higher homologs, counterbalance each other. The term "balancing" or "counterbalancing" is herein used to designate the process of preventing a high degree of polymerization in a hydrocarbon nuclear coolant by providing an opposite, but not necessarily equal, degradation of such hydrocarbon coolant. The optimum operating condition would, of course, be when the particular polyphenyl or condensed ring compound used remains as the same homolog due to the equal and opposite effects of polymerization and degradation. Although in practice this condition would be difficult to obtain, the effect of degradation on the polymerizing hydrocarbon will allow such hydrocarbon to withstand the full effect of pyrolitic and radiation decomposition which tends to cause polymerization of said hydrocarbon. The degradation thus acts as a compensating means preventing at least a high degree of polymerization and insures a workable hydrocarbon reactor coolant.

Therefore an object of this invention is to provide a method of stabilizing an organic nuclear coolant.

A further object of this invention is to provide a method of inhibiting the polymerization of a hydrocarbon coolant during operation in a nuclear reactor.

A still further object of this invention is to provide a method of preventing a high degree of polymerization from taking place in a hydrocarbon nuclear reactor coolant.

Another object of this invention is to provide an aromatic hydrocarbon nuclear reactor coolant having increased stability under conditions of operation in a nuclear reactor.

An additional object of this invention is to provide a modified aromatic hydrocarbon reactor coolant having increased stability and efficiency.

The above objects as well as other objects of this invention will become apparent from the following description.

Organic coolants used in nuclear reactors are subjected to both pyrolitic and radiation decomposition when such coolants are subjected to nuclear irradiations and heat from an operating reactor. This decomposition, it is believed, causes cleavage of the bonds of the ring structure of the organic coolants forming primary free radical products which under normal conditions will link to each other forming complex organic chains which lead to the polymerization of these products into unwanted and unworkable polymers or resins. In order to enhance the operating range, stability, and workability of such coolants it has been desired to prevent or suppress polymerization resulting from the pyrolitic and radiation decomposition. The present invention provides a means for counterbalancing the formation of such polymers. The invention comprehends exposing an aromatic hydrocarbon coolant to the catalytic action of an inorganic compound chosen from the class consisting of the halides of aluminum and tin. When the polyphenyls and condensed ring compounds of the present invention are heated in the presence of these catalysts the hydrocarbon materials have the tendency to degrade into lower homologs of the hydrocarbon. Thus when biphenyl is passed over aluminum chloride ($AlCl_3$) at 250°–300° C. a major proportion of benzene is formed. In addition to the benzene small amounts of cyclohexane, toluene and methylcyclopentane are formed. In a typical example of the above degradation 73.5% benzene, 4% cyclohexane, 4% toluene, and 18.5% methylcyclopentane are the products. It is to be noted that no paraffins or olefins are formed in the degradation of biphenyl. It has been found, by test, that when biphenyl, for example, is subjected to pyrolitic and radiation decomposition that phenyl free radicals are produced which react with one and other to produce terphenyls, quaterphenyls, and still higher polymers of benzene. Only traces of benzene are formed during the pyrolysis and radiation decomposition of the applicable aromatic hydrocarbons. The invention contemplates balancing out the tendency of the aromatic hydrocarbons to polymerize into higher homologs of benzene with the tendency of these same aromatic hydrocarbons to degrade into lower benzene homologs, when subjected to pyrolitic and radiolitic decomposition, and to the catalytic action of the halides of aluminum and tin, respectively.

The aromatic hydrocarbons used as nuclear coolants have an operating range of from 100°–500° C. dependent upon the particular hydrocarbon, and the amount and kind of radiation to which the coolant is subjected and to the pressures within the reactant coolant system. These considerations as well as the neutron capture cross-section of the various components determine which aromatic hydrocarbon and which halide would be most suitable for use as a primary, secondary or intermediate coolant. The aromatic hydrocarbons contemplated by this invention are the polyphenyls and the condensed ring compounds or mixtures thereof, which, in comparison to other organics, have a relatively high stability when subjected to pyrolitic and radiation effects. Specifically, biphenyl, ortho, meta, or paraterphenyl, the quaterphenyls or mixtures thereof may be given as examples of the polyphenyls used, while naphthalene, anthracene, and phenanthrene may be given as examples of the condensed ring compounds. The above hydrocarbons have melting points which enable them to be in the liquid state in the 400°–500° C. operating range. For example, meta-terphenyl melts at approximately 87° C., para-terphenyl melts at 213° C. and para-quaterphenyl melts at a value over 300° C.

As stated above the catalysts employed to degrade the above hydrocarbons to lower homologs of benzene and to, in fact, balance out the tendency of these hydrocarbons to polymerize upon exposure to pyrolitic and radiation effects are the halides of aluminum and tin. While anhydrous aluminum chloride due to its cost and availability may best be used the other halides of aluminum, aluminum fluoride, aluminum bromide and aluminum iodide may also be employed to degrade these aromatic hydrocarbons. Each of these aluminum halides are solids at room temperatures. The fluoride and iodide, however, melt at 180° C. and thus in usage as a degrading agent in the reactor coolant will be in the form of an immiscible liquid within the liquid hydrocarbon. It is to be understood that each of these aluminum halides should be in the anhydrous form. The choice of a particular stannic halide is basically dependent upon the desired operating range of the hydrocarbon coolant and to the amount of pressurization in the reactor coolant system. Stannic bromide is a liquid at room temperature and boils at 203° C. The chloride is a liquid which boils at 111° C. while at room temperatures the fluoride and iodide are solids which boil at 705° C. and 341° C., respectively. A further consideration in the choice of a particular catalyst is the neutron capture cross-section of the elements making up such compound. For reactor applications this cross-section should be of a low value. The neutron capture cross-sections of aluminum, tin, chlorine, and fluorine are 0.22, 0.6, 32, and .009 barns, respectively. These values favor to some degree the use of the fluorides as a dispersive within the hydrocarbon coolant.

In practicing the instant invention it is necessary to obtain a ratio of halide content to hydrocarbon content to maintain approximately an equilibrium effect on the hydrocarbon between the degradation process and the polymerization. The actual formulation of a particular ratio is dependent upon the multiplicity of factors including (1) type and amount of radiation from the nuclear reactor, (2) particular aromatic hydrocarbon and metal halide chosen, (3) the flow rate, agitation and amount of pressure within the cooling system, (4) viscosity of the coolant used, (5) the operating temperature within the reactor, (6) the heat transfer rates of the coolant, and (7) the size of the halide compound particles when the compound is in a dispersed form within the liquid hydrocarbon at the operating temperatures. It has been determined that from 0.1 to 5% of halide catalyst will be sufficient to increase the stability of the hydrocarbon by degrading the hydrocarbon to lower homologs of benzene as these hydrocarbons are tending to polymerize to higher homologs of benzene under the pyrolitic and radiolitic effects in a nuclear reactor. By judicious choice of particular formulation in this range, taking into consideration the enumerated variables, a balance or approximate balance can be reached between the degradation process and the polymerization process. It can be seen that the percent of aluminum or tin halide will not necessarily be constant. More or less halide can be dispersed as the tendency of the coolant to polymerize increases or decreases.

The aluminum or tin halide may be in the form of a dispersed powder within the liquid hydrocarbon coolant or may be a liquid phase dispersion within that hydrocarbon. This is dependent upon the particular aluminum or tin halide chosen and the operating temperature and pressure of the cooling system. The instant invention alternatively comprehends having the liquid aromatic hydrocarbon come in intermittent contact with the halide catalyst. Ordinarily, however, the catalyst should be present as a dispersant within the hydrocarbon in the immediate area in which the hydrocarbon is being decomposed into the phenyl free radicals and where these phenyl free radicals tend to cause polymerization into the higher homologs of benzene. It can be seen that control of the viscosity (which is an approximate measure of the amount of polymerization) of the coolant can be accomplished by merely providing a halide-hydrocarbon ratio which keeps the degradation process and the polymerization process in a rough balance.

Although the invention has been described in detail, it is to be clearly understood that the same is by way of example only and is not to be taken by way of limitation, the spirit and scope of this invention being limited only by the terms of the appended claims.

I claim:

1. A method of inhibiting radiolytic damage to an aromatic hydrocarbon under nuclear irradiation, which comprises adding from 0.1% to 5% of an anhydrous inorganic compound selected from the class consisting of halides of aluminum and halides of tin to a hydrocarbon selected from the group consisting of polyphenyls having two to four benzene rings and aromatic condensed ring compounds having from two to three condensed 6-membered rings therein.

2. The method of claim 1 wherein said polyphenyl is terphenyl.

3. The method of claim 1 wherein said polyphenyl is terphenyl and said inorganic compound is anhydrous aluminum chloride.

References Cited in the file of this patent

UNITED STATES PATENTS

| | | |
|---|---|---|
| 2,143,941 | Crawford | Jan. 17, 1939 |
| 2,172,391 | Krase | Sept. 12, 1939 |
| 2,297,292 | Davis | Sept. 29, 1942 |
| 2,412,589 | Lieber | Dec. 17, 1946 |
| 2,561,916 | Erickson | July 24, 1951 |
| 2,683,138 | Goering et al. | July 6, 1954 |
| 2,697,694 | Shalit et al. | Dec. 21, 1954 |
| 2,708,656 | Fermi et al. | May 17, 1955 |

(Other references on following page)

FOREIGN PATENTS 697,601     Great Britain _____ Sept. 23, 1953

OTHER REFERENCES

Nuclear Engineering, Part II, Chemical Engineering Progress Symposium Series, No. 12 (1954), vol. 50, publ. by American Institute of Chemical Engineers, N.Y.C. (includes the papers which were presented at Ann Arbor, Mich., in June 1954), pages 32-39.

"The Science and Engineering of Nuclear Power," vol. II, Clark Goodman (1949), Addison-Wesley Press, Cambridge, Mass., pages 211-213.

TID-10018, January 9, 1953, "Research on the Radiation Stability of Organic Fluids," Progress Report No. 4, June 1, 1952-December 31, 1952. Available from Office of Technical Service, Dept. of Commerce, Washington 25, D.C.